United States Patent
Keller et al.

(10) Patent No.: US 10,496,169 B2
(45) Date of Patent: Dec. 3, 2019

(54) WEARABLE ACCESSORY WITH HEAT TRANSFER CAPABILITY

(71) Applicant: Facebook Technologies, LLC, Menlo Park, CA (US)

(72) Inventors: Sean Jason Keller, Kirkland, WA (US); Tristan Thomas Trutna, Seattle, WA (US); David R. Perek, Bellevue, WA (US); Bruce A. Cleary, III, Seattle, WA (US); Brian Michael Scally, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 256 days.

(21) Appl. No.: 15/379,687

(22) Filed: Dec. 15, 2016

(65) Prior Publication Data

US 2017/0168577 A1    Jun. 15, 2017

Related U.S. Application Data

(60) Provisional application No. 62/267,904, filed on Dec. 15, 2015.

(51) Int. Cl.
| | |
|---|---|
| *F28F 13/00* | (2006.01) |
| *G06F 3/01* | (2006.01) |
| *A41D 19/015* | (2006.01) |
| *G06T 19/00* | (2011.01) |

(52) U.S. Cl.
CPC .............. *G06F 3/016* (2013.01); *G06F 3/014* (2013.01); *A41D 19/01535* (2013.01); *F28F 13/00* (2013.01); *F28F 2013/008* (2013.01); *G06T 19/006* (2013.01)

(58) Field of Classification Search
CPC .......... F28F 2013/005; F28F 2013/008; F28F 13/00; F25D 19/006
See application file for complete search history.

(56) References Cited

U.S. PATENT DOCUMENTS

| | | | |
|---|---|---|---|
| 2006/0048932 A1* | 3/2006 | Rubenstein | H01L 23/467 165/185 |
| 2006/0074325 A1* | 4/2006 | Karo | A61B 5/02141 600/494 |
| 2007/0257766 A1* | 11/2007 | Richards | B82Y 10/00 337/298 |
| 2009/0040007 A1* | 2/2009 | Stenmark | H01H 37/36 337/324 |
| 2009/0277608 A1* | 11/2009 | Kamins | F25D 19/006 165/82 |

* cited by examiner

*Primary Examiner* — Eric S Ruppert
(74) *Attorney, Agent, or Firm* — Fenwick & West LLP

(57) ABSTRACT

A wearable heat transfer device provides a user with haptic feedback providing sensations of hot or cold. The wearable heat transfer device comprises a heat source/sink and a programmable interface having heat transfer characteristics that are modified based on a signal received by the programmable interface. For example, a thickness of the programmable interface changes based on the received signal, altering heat transfer by the programmable interface. In another example, an electric field is applied to the programmable interface, changing one or more properties of the programmable interface affecting heat transfer.

9 Claims, 7 Drawing Sheets

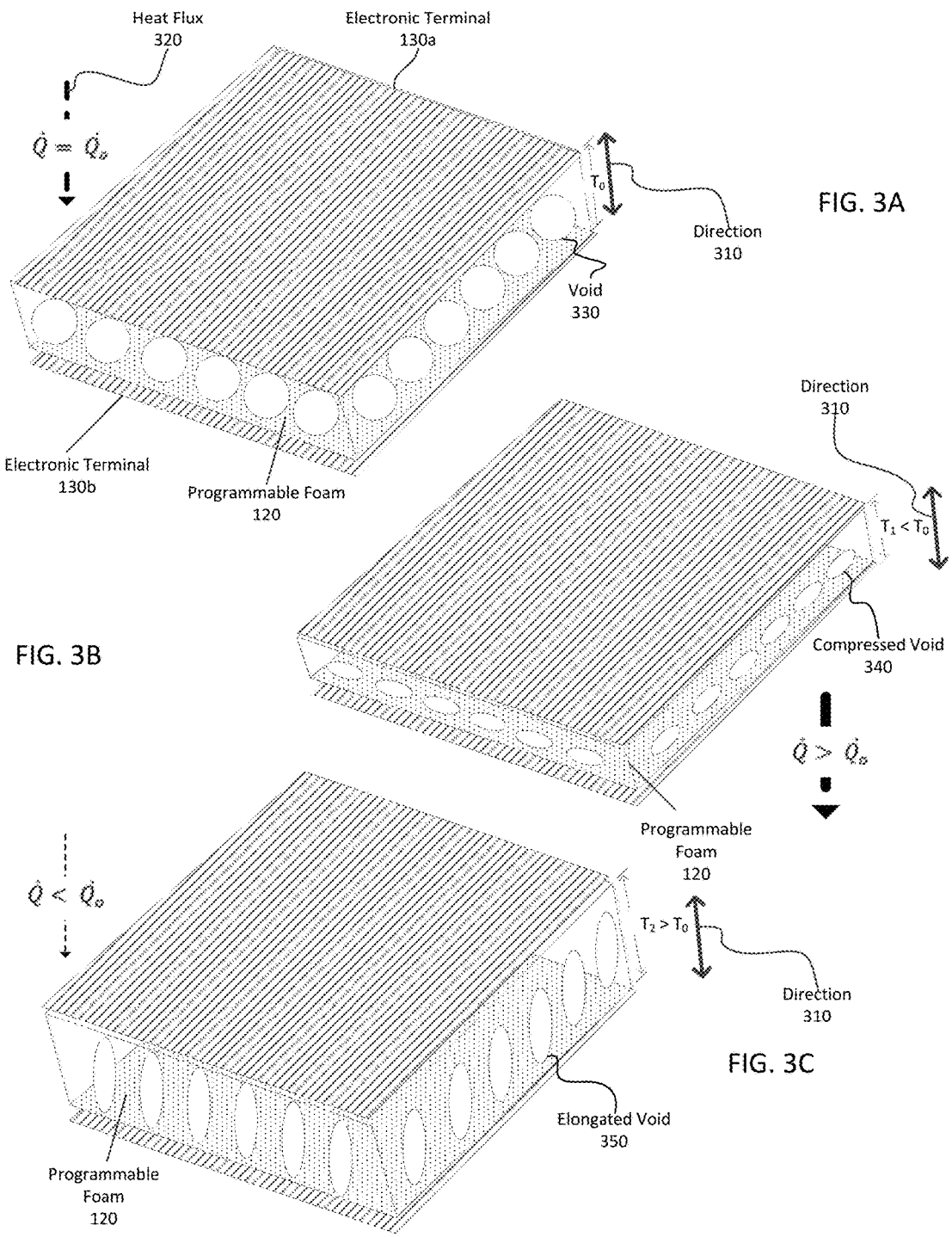

WEARABLE ACCESSORY WITH HEAT TRANSFER CAPABILITY

CROSS-REFERENCE TO RELATED APPLICATIONS

This application claims the benefit of U.S. Application No. 62/267,904, filed Dec. 15, 2015 which is incorporated by reference in its entirety.

BACKGROUND

This disclosure generally relates to wearable heat transfer devices, and more specifically to a flexible, wearable heat transfer device capable of being worn on a user's body and repeatedly bent in various planes without operational failure.

Many remote control applications are enhanced by providing a user with a degree of haptic feedback. For example, in a virtual reality environment, haptic feedback may provide a user with a sense of a virtual object's temperature. Hence, haptic feedback may assist in a user's remote creation or manipulation of virtual or real objects. Conventional virtual reality (VR) and augmented reality (AR) visually and aurally present content to users via displays and speakers, respectively. However, many VR and AR applications benefit from providing haptic feedback in addition to presenting audio and video content. Haptic feedback allows an AR or a VR system to more fully immerse a user in an augmented or a virtual world by allowing the user to more effectively interact with the augmented or virtual world. For example, haptic feedback allows a VR or an AR system to expose a user to temperature changes that increase the user's sense of the virtual or augmented world.

Traditional heat transfer interfaces rely on heat transfer such as conduction, diffusion, convection, and radiation. Accordingly, traditional heat transfer devices are often physically connected to an external heat source and heat sink and have a high thermal conductivity to conduct heat from the heat source to an external environment. However, in many applications, use of high thermal conductivity and an external heat source prevents traditional heat transfer devices from being easily wearable. Moreover, in various embodiments, a heat transfer device may be attached to joints or other surfaces subject to stretching or flexing. Conventional heat transfer devices lack malleability and flexibility to be readily used when affixed to surfaces that stretch or flex.

SUMMARY

A glove (or other wearable feedback element) includes a mechanism for applying a hot or cold sensation to a portion of a user's body contacting the glove. The mechanism includes a heat source or sink that is thermally coupled to a substrate via an interface, such as a programmable foam. In one or more embodiments, the substrate is a user's appendage, such as a hand, or other portion of the user's body. In another embodiment, the substrate is a surface of the glove or other wearable feedback element. The programmable foam has controllable heat transfer characteristics that provide feedback to the user. For example, heat transfer characteristics of the programmable foam are controlled to provide a hot or cold sensation to a portion of the user's body contacting or proximate to the programmable foam. In various embodiments, the programmable foam includes a plurality of controllable elements that change heat transfer properties with direction (e.g., a material impregnated with metallic balls or nanowires), which may be aligned or randomized rapidly increase or decrease thermal conductivity of the programmable foam.

BRIEF DESCRIPTION OF THE DRAWINGS

FIG. 3A illustrates a programmable foam in the absence of any deformations and a baseline heat flux, in accordance with one or more embodiments.

FIG. 3B is an isotropic view of a programmable foam undergoing a compression deformation along a dimension, in accordance with one or more embodiments FIG. 3C is an isotropic view of a programmable foam undergoing an expansion deformation along a dimension, in accordance with one or more embodiments.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Figure 1A:
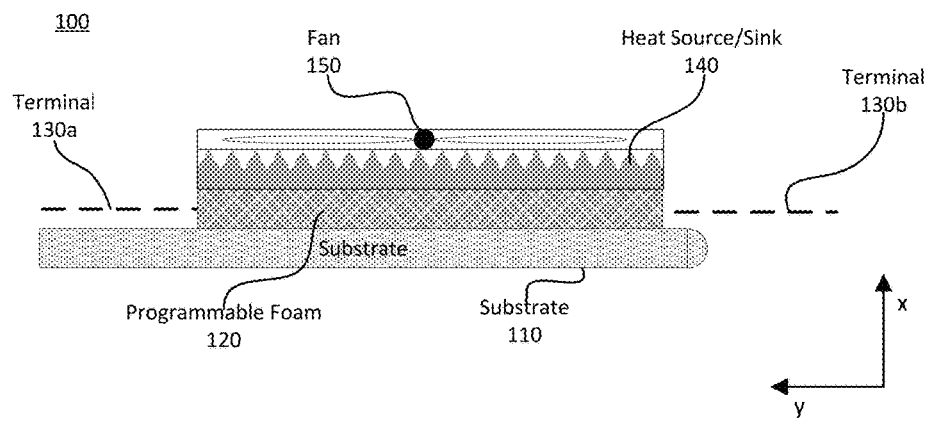
FIG. 1A illustrates a cross-section of a wearable heat transfer device along the X-Y plane with an applied deformation in accordance with one or more embodiments.
Figure 1B:
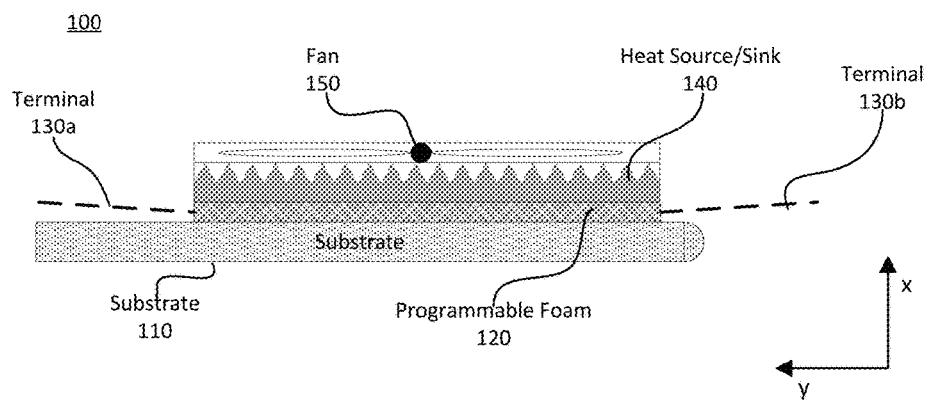
FIG. 1B illustrates a cross-section of a heat transfer device along an X-Y plane with an applied compression in accordance with one or more embodiments.
Figure 1C:
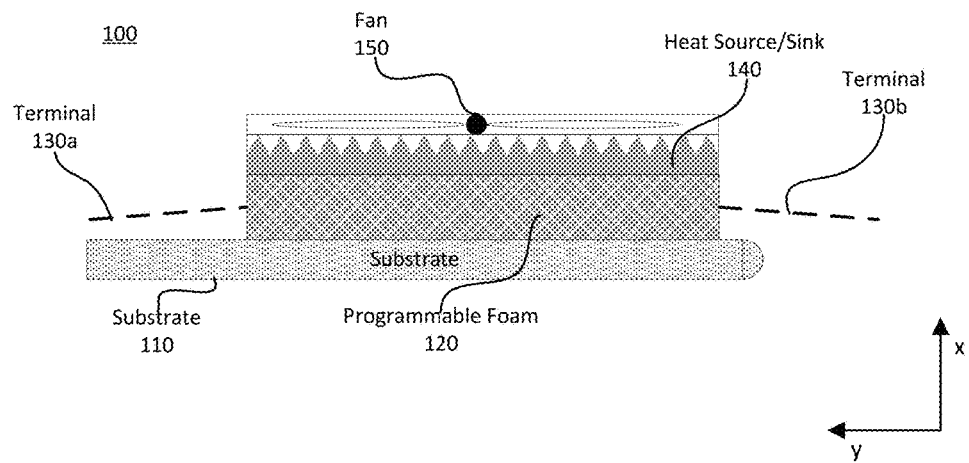
FIG. 1C illustrates a cross-section of a heat transfer device along an X-Y plane with an applied elongation in accordance with one or more embodiments.

FIG. 1A illustrates an embodiment of a cross-section of a wearable heat transfer device 100 along an X-Y plane with no applied deformation. FIG. 1B illustrates a cross-section of an embodiment of the heat transfer device 100 with an applied compression parallel to the X-axis. And FIG. 1C illustrates a cross-section of an embodiment of the heat transfer device 100 with an applied elongation parallel to the X-axis. The heat transfer device 100 shown in FIGS. 1A-1C is one example of a heat transfer device, and in other embodiments, the heat transfer device 100 may include additional fewer, or different components than those described in conjunction with FIGS. 1A-1C.

In the example of FIG. 1A, the heat transfer device 100 is thermally coupled to a substrate 110, such as a glove fabric or a user's skin. The heat transfer device 100 depicted in FIG. 1A comprises a programmable foam 120, electronic terminals 130a and 130b, a heat source/sink 140, and a fan 150. In one or more embodiments, the heat source/sink 140 is a heating element configured to convert electricity into heat through resistive or Joule heating. For example, the heat source/sink 140 comprises one or more metallic heating elements, ceramic heating elements, polymer Positive Temperature Coefficient (PTC) heating elements, composite heating elements, or any combination thereof. In other embodiments, the heat source/sink 140 additionally includes a passive heat exchanger that transfers thermal energy to a fluid medium external to the heat source/sink 140, such as air or liquid, which dissipates the thermal energy. In one or more embodiments, the heat source/sink 140 is a thermoelectric device that may be used to heat and to cool the programmable foam 120. An example thermoelectric device is a solid-state Peliter device capable of electronically heating and cooling the programmable foam 120.

The heat transfer device 100 additionally comprises a fan 150. In various embodiments, the fan 150 is positioned in a heat transfer path between an environment external to the heat source/sink 140 and the heat source/sink 140. In the example depicted in FIG. 1A, the fan 150 is between the heat source/sink 140 and an environment external to the heat transfer device 100. In this embodiment, the fan 150 enables a rapid heat exchange between the programmable foam 120 and the environment external to the heat transfer device 100. In other embodiments, the heat transfer device 100 does not include a fan 150 positioned proximate to the heat source/sink 140, so heat is passively conducted from the substrate 110 to the programmable foam 120 to the heat source/sink 140, which dissipates the heat to the environment external to the heat transfer device 100.

The electronic terminals 130a and 130b propagate a voltage or current to or from the programmable foam 120. In various embodiments, the application of a current or voltage to the programmable foam 120 through the terminals 130a and 130b causes the programmable foam 120 to compress or to expand in a direction, shown as along the X-axis in FIGS. 1A-1C. Expansion or compression of the programmable foam 120 in the direction causes a reversible change in a thickness of the programmable foam 120. In an embodiment, thermal characteristics of the programmable foam 120 are related to the thickness of the programmable foam 120. Hence, application of a current or a voltage to the programmable foam 120 causes a reversible change in the thermal characteristics of the programmable foam 120.

The programmable foam 120 is positioned as a thermal path between the heat source/sink 140 and the substrate 110. Specifically, in FIG. 1A, the programmable foam 120 is positioned between the heat source/sink 140 and the substrate 110 and contacts the heat source/sink 140 and the substrate 110. In various embodiments, the programmable foam 120 comprises a flexible dielectric material having a thermal conductivity. The flexible dielectric material additionally includes a plurality of voids that may be filled with a gas or liquid having an alternative thermal conductivity that is lower than the thermal conductivity of the flexible dielectric material. For example, the programmable foam 120 is an open cell foam having voids are filled with a gas or with a liquid that may have a thermal conductivity lower than a thermal conductivity of the open cell foam. In some embodiments, the programmable foam 120 includes a piezoelectric actuator or air bladder configured to respond to a voltage or to a current received from a local controller (not shown). The programmable foam 120 is further described, below in conjunction with FIGS. 3A-3C.

In one or more embodiments the programmable foam 120 is connected to a local controller (not shown) via electronic terminals 130a and 130b. The local controller (not shown) is configured to receive one or more instructions from a VR console and to generate a voltage or a current based on the received instructions. In other embodiments, the local controller comprises a database of predefined voltages and currents (such as voltage waveforms or current waveforms) and the local controller (not shown) retrieves a predefined voltage or a predefined current based on the received instructions. Hence, the local controller (not shown) comprises a combination of one or more passive and active circuit elements (e.g., resistors, capacitors, transistors, digital to analog converters, and analog to digital converters, etc.) for determining a voltage or a current and for communicating with the VR console. For example, the local controller (not shown) communicates with the VR console to provide the VR console with information about the status of the heat transfer device 100. The VR console is further described below in conjunction with FIG. 5.

The local controller (not shown) is also configured to propagate the generated (or retrieved) current or voltage waveform to the electronic terminals 130a and 130b via one or more wires or other connection between the local controller (not shown) and the electronic terminals 130a and 130b. In some embodiments, the generated current or voltage is a periodic signal having a particular frequency (e.g., sinusoidal wave). For example, the programmable foam 120 is responsive to signals over a fixed frequency range (0 Hz-10 kHz) and the local controller (not shown) generates or retrieves a voltage or a current that is a waveform in the fixed frequency range. In other embodiments, the generated or retrieved voltage is a transitory voltage pulse, a constant voltage, or any combination thereof. In these embodiments, a peak voltage value of the generated or retrieved may be associated with a magnitude of thermal energy generated by the heat source/sink 140 and the heat flux of the programmable foam 120.

When the programmable foam 120 receives the generated current or voltage, a heat flux associated with the programmable foam 120 increases or decreases based on the received voltage or current. For example, the generated voltage or current causes the programmable foam 120 to expand or contract along a direction (e.g., along the X-axis in FIG. 1A). Expansion or contraction of the programmable foam 120 along the X-axis reversibly changes an effective thermal conductivity between the heat source/sink 140 and the substrate 110 (e.g., the thickness of the programmable foam 120). In an example embodiment, the thickness of the programmable foam 120 may change by 10 to 90 percent in response to the magnitude of a voltage signal received from a local controller (not shown). A change in the thickness of the programmable foam 120 modifies a thermal conductivity associated with the programmable foam 120, which modifies a heat flux of the programmable foam 120. For example, increasing the thickness of the programmable foam 120 by a few millimeters decreases thermal conductivity of the programmable foam 120, which, in turn, decreases the rate of heat transfer between the heat source/sink 140 and substrate 110, by 100 milliwatts per Kelvin.

FIG. 1B illustrates a decrease in the thickness of the programmable foam 120 in response to a received voltage or current. In some embodiments, decreasing the thickness of the programmable foam 120 improves heat transfer by shortening a length of the conductive path between the heat source/sink 140 and the substrate 110. For example, in FIG. 1B the decrease in the thickness of the programmable foam 120 along the X-axis causes the heat source/sink 140 and the fan 150 to be positioned closer to the substrate 110 than in the example shown by FIG. 1A. Decreasing the thickness of the programmable foam 120 increases a rate of heat transfer between the heat source/sink 140 and the substrate 110. In one or more embodiments, the rate of heat transfer between the substrate 110 and the heat source/sink 140 via the programmable foam 120 is proportional to the thickness of the programmable foam 140. Alternatively, decreasing the thickness of the programmable foam 120 may result in a corresponding decrease a rate of heat transfer between the heat source/sink 140 and the substrate 110. The programmable foam 120 is further described below in conjunction with FIGS. 3A-3C.

Conversely, FIG. 1C illustrates an expansion of the thickness of the programmable foam 120 along a direction. In FIG. 1C, the programmable foam 120 is configured to expand along the X-axis (e.g., increase in thickness) in in response to a received voltage or current. In various embodiments, the heat flux of the programmable foam 120 is inversely proportional to the thickness of the programmable foam 120. Hence, the thermal conductivity of the programmable foam 120 decreases as the thickness of the programmable foam 120 increases. For example, an increase in thickness of the programmable foam 120 decreases of heat conductivity of the programmable foam 120.

Figure 2A:
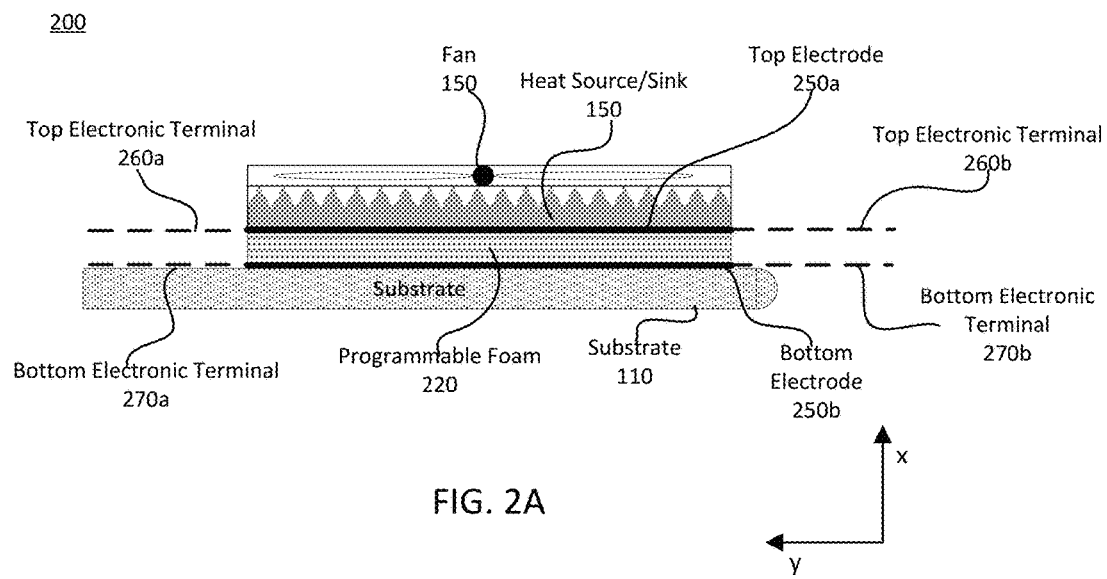
FIG. 2A illustrates a cross-section of a heat transfer device in the absence of an applied electric field in accordance with one or more embodiments.
Figure 2B:
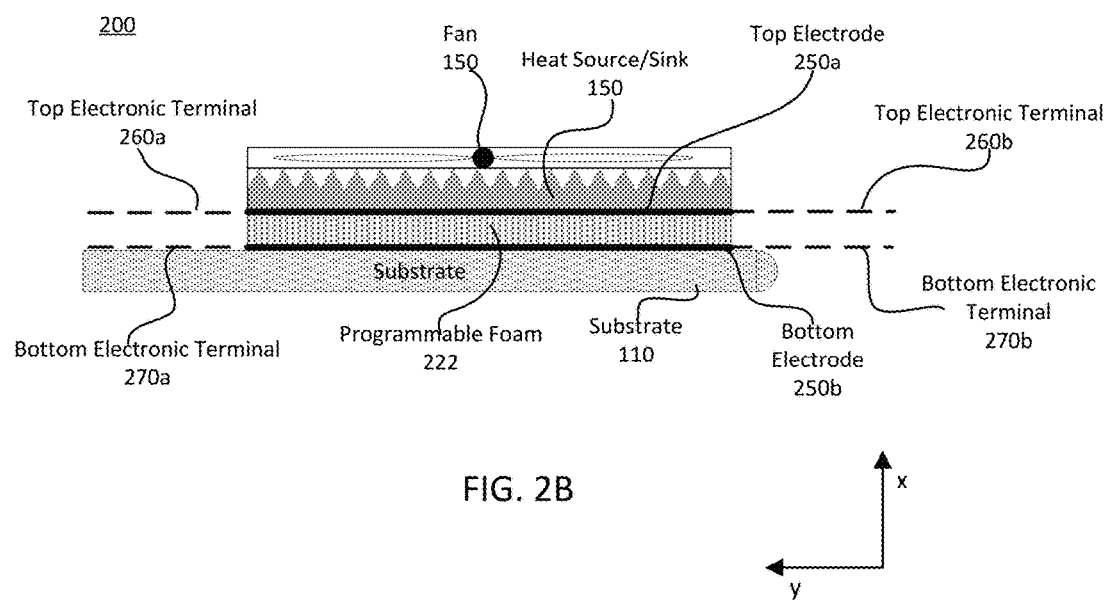
FIG. 2B illustrates a cross section of a heat transfer device along an X-Y plane in the presence of an applied electric field in accordance with one or more embodiments.

FIGS. 2A and 2B illustrate a cross section along a plane (an X-Y plane shown in FIGS. 2A and 2B) of an embodiment of wearable heat transfer device 200 with and without application of an electric field to the wearable heat transfer device 200. In FIGS. 2A and 2B, the heat transfer device 200 is an embodiment of the heat transfer device 100 depicted in FIGS. 1A-1C. However, the heat transfer device 200 may include different or additional components in various embodiments.

FIG. 2A illustrates a cross-section of an embodiment of the heat transfer device 200 in the absence of an applied electric field. As shown in FIG. 2A, the heat transfer device 200 comprises a programmable foam 220, top and bottom electrodes 250a and 250b, respectively, top electronic terminals 260a and 260b, bottom electronic terminals 270a and 270b, a heat source/sink 140, and a fan 150. In FIG. 2A, the programmable foam 220 is positioned between the substrate 110 and the heat source/sink 140. The programmable foam 220 is further described, below in conjunction with FIGS. 4A and 4B. While FIG. 2A shows an embodiment of a heat transfer device 200 having a fan 150 positioned between the heat source/sink 140 and an environment external to the heat transfer device 200, in other embodiments, heat transfer device 200 does not include a fan 150. The fan 150 and the heat source/sink 140 are further described above in conjunction with FIG. 1A.

Each electrode 250a and 250b comprises a high conductivity material (e.g., gold, aluminum) and is configured to allow generation of a uniform electric field across the programmable foam 220. In other embodiments, electrodes 250a and 250b are configured to generate a uniform magnetic field across the programmable foam 220. The electrodes 250a and 250b are connected to top electronic terminals 260a and 260b, and bottom electronic terminals 270a and 270b. The top electronic terminals 260a and 260b and the bottom electronic terminals 270a and 270b are coupled to the electrodes 250a and 250b through low resistance contacts. In one or more embodiments, the top electronic terminals 260a and 260b and the bottom electronic terminals 270a, and 270b are also connected to an external controller (not shown) through flexible conductive traces or another suitable type of connection. The external controller (not shown) is configured to apply a voltage or a current to the top electronic terminals 260a and 260b and to the bottom electronic terminals 270a and 270b, which generates a known electric field across the programmable foam 220.

The programmable foam 220 comprises a flexible dielectric material having a thermal conductivity and including a plurality of voids that are filled with a polar or non-polar solvent (e.g., oil or air) having a different thermal conductivity that is lower than the thermal conductivity of the dielectric material. The solvent is chosen to dissolve or to suspend anisotropic molecules (e.g., molecules with a well-defined dipole moment), which may be configured to align along electric field lines in the presence of an electric field. In various embodiments, the anisotropic molecule is a nanosphere, a nanowire, a nanorod, or another monomer or polymer with a well-defined dipole moment. In other embodiments, the anisotropic molecule is a nematic liquid crystal functionalized with a metal or another thermally conductive molecule. The anisotropic molecules may be configured with a high thermal conductivity in one orientation and a low thermal conductivity in another orientation and are configured to align in the presence of an electric field. For example, the anisotropic molecules have a high thermal conductivity when aligned with field lines of an electric field and have a low thermal conductivity when not aligned with field lines of the electric field. In the embodiment depicted in FIG. 2A, each anisotropic molecule has a low thermal conductivity when having a particular orientation relative to a reference axis (e.g., a particular orientation along the Y-axis) and a high thermal conductivity when having an alternative orientation relative to the reference axis (e.g., an alternative orientation along the Y-axis). In other embodiments, each of the anisotropic molecules is additionally or alternatively magnetically anisotropic (e.g., a molecule with a defined magnetic dipole). In these embodiments, the anisotropic molecules are configured to align in the presence of an applied magnetic field, so application of a controllable electric or magnetic field to the programmable foam 220 alters the thermal conductivity of the programmable foam 220. In FIG. 2A, the programmable foam 220 is positioned between a heat source/sink 140 and a substrate 110 such as a user's skin or glove. The programmable foam 220 is further described below in conjunction with FIGS. 4A and 4B.

FIG. 2B illustrates a cross-section of an embodiment of the heat transfer device 200 in the presence of an applied electric field along the X-Y plane. As depicted in FIG. 2B, in the presence of an applied electric field, the anisotropic molecules included in the voids of the programmable foam 220 align with electric field lines through the programmable foam 220. In other embodiments, the top electrode 250a and the bottom electrode 250b are configured to apply a magnetic field through the programmable foam 220, and anisotropic molecules in voids of the programmable foam 220 respond to the magnetic field and align with magnetic field lines through the programmable foam 220. Alignment of the anisotropic molecules with electric or magnetic field lines generates a thermally conductive path from the heat source/sink 150 to the substrate 110.

FIGS. 3A, 3B, and 3C illustrate compression and elongation deformation of the programmable foam 120 along a direction 310. FIG. 3A is an isotropic view of a programmable foam 120 to which a top terminal 130a and a bottom terminal 130b are attached. Embedded within the programmable foam 120 are a plurality of voids 330. FIG. 3A illustrates the programmable foam 120 in the absence of deformations and the resulting baseline heat flux ($\dot{Q}_o$) 320 of the programmable foam 120. FIG. 3B is an isotropic view of the programmable foam 120 undergoing a compression deformation along a direction 310, while FIG. 3C is an isotropic view of a programmable foam 120 undergoing an expansion deformation along the direction 310.

Compression or elongation of the programmable foam along the direction 310 causes a corresponding increase or decrease in thickness of the programmable foam 120. In FIG. 3B, the compression decreases the thickness of the programmable foam 120 along the direction 310. As illustrated in FIG. 3B, a compression deformation results in a programmable foam 120 with a thickness of $T_1$ which is smaller than the nominal thickness $T_0$ of the uncompressed programmable foam 120 shown in FIG. 3A. In an embodiment, decreasing thickness of the programmable foam 120 results in compressed voids 340 within the programmable foam 120. In an example embodiment, the voids 330 are roughly spherical when the programmable foam 120 is at its uncompressed nominal thickness $T_0$. However, as depicted in conjunction with FIG. 3B, compressing the programmable foam 120 results in the voids 330 having an ellipsoid configuration with a semi-major axis of the ellipsoid perpendicular to the direction 310 in which the programmable foam 120 is compressed.

In various embodiments, the programmable foam 120 is additionally coupled to a piezoelectric actuator that is coupled to the top electrode 130a and to the bottom electrode 130b. For example, when the piezoelectric actuator compresses, it draws the top electrode 130a towards the bottom electrode 130b, decreasing the thickness of the programmable foam 120 to the thickness $T_1$ shown in FIG. 3B. In the examples of FIGS. 3A and 3B, the thickness $T_1$ is less than or equal to the nominal thickness $T_0$ of the programmable foam 120. Alternatively, when the piezoelectric actuator extends, the top electrode 130a and the bottom electrode 130b are pushed farther apart, which increases the thickness of the programmable foam 120 to a thickness $T_2$ that is larger than the nominal thickness $T_0$.

In other embodiments, the programmable foam 120 includes an air bladder. Deflating the air bladder decreases the thickness of the programmable foam 120 to the thickness $T_1$, causing the voids 330 to compress into compressed voids 340 shown in FIG. 3B. Alternatively, inflating the air bladder increases in the thickness of the programmable foam 120, which elongates the voids 330, as further described below in conjunction with FIG. 3C.

In one or more embodiments, compressing the voids 330 forces dielectric material surrounding the voids into greater contact, increasing the effective thermal conductivity of the programmable foam 120 by decreasing a length of a conductive path through the programmable foam 120. Thus, decreasing the thickness of the programmable foam 120 in the direction 310 increases the heat flux 320 of the programmable foam 120. As shown in FIG. 3B, the heat flux 320 of the compressed programmable foam 120 is greater than the heat flux 320 of the uncompressed foam.

Conversely, increasing in the thickness of the programmable foam 120 in the direction 310, as shown in FIG. 3C, causes the voids 330 to elongate, creating elongated voids 350. The elongated voids 350 increase a distance of the conductive path through the programmable foam 120, which decreases the heat flux 320 of the expanded programmable foam 120 relative to the heat flux 320 of the unexpanded programmable foam 120. Generally, the thickness of the programmable foam 120 is inversely proportional to the magnitude of the heat flux 320 through the programmable foam 120. For example, a 50% percent increase in the permeability (cross-sectional area of the voids) of the programmable foam 120 in the direction 310 decreases the heat flux 320 of the programmable foam 120 by 10% percent. In other example embodiments, a change in the amount of heat flux 320 may be tuned by increasing or decreasing the number of voids in the programmable foam 120. While FIG. 3C shows an embodiment where expansion of the programmable foam 120 in the direction 310 decreases the heat flux 320 of the programmable foam 120, in other embodiments, increasing the thickness of the programmable foam 120 in the direction 310 increases the heat flux 320 of the programmable foam, and decreasing the thickness of the programmable foam 120 in the direction decreases the heat flux 320 of the programmable foam.

Figure 4A:
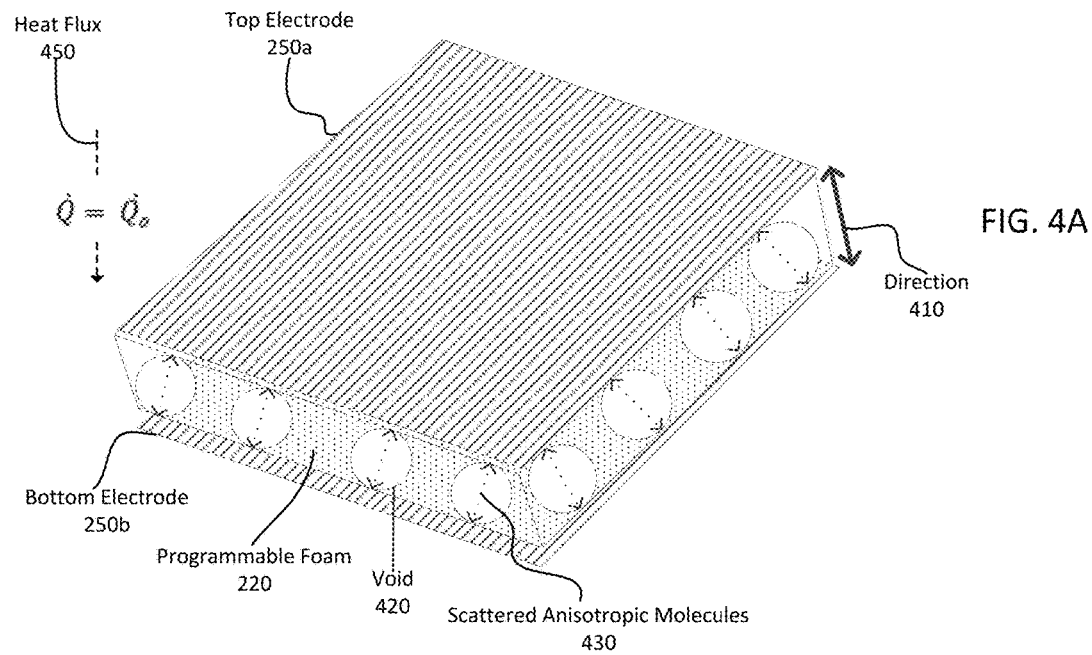
FIG. 4A illustrates an isometric view of programmable foam in the absence of an applied electric field, in accordance with one or more embodiments.
Figure 4B:
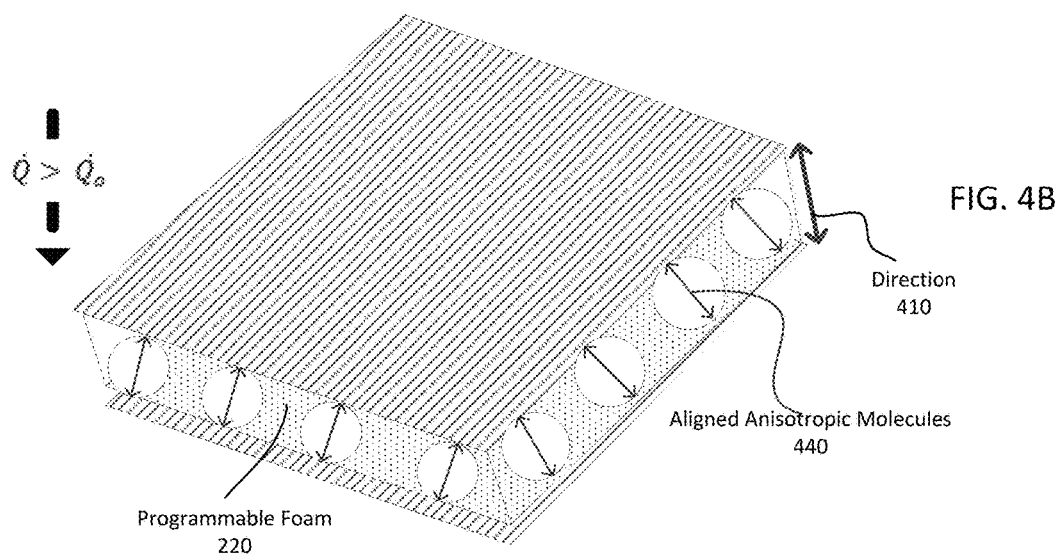
FIG. 4B illustrates a programmable foam in the presence of an electric field parallel to a direction, in accordance with one or more embodiments.

FIG. 4A and 4B are examples of the programmable foam 220 when an electric field is applied to the programmable foam 220 and when the electric field is not applied to the programmable foam 220. In FIGS. 4A and 4B, the electric field is applied between a top electrode 250a positioned proximate to a side of the programmable foam 220 and a bottom electrode 250b proximate to another side of the programmable foam 220 and parallel to the top electrode 250a. Hence, the electric field is applied to the programmable foam 220 in a direction parallel to a direction 410. In one or more embodiments, the top electrode 250a and the bottom electrode 250b comprise slabs of a high conductivity material. For example, the top electrode 250a and the bottom electrode 250b each comprise a slab of gold or silver, so application of a voltage or a current to the top electrode 250a and the bottom electrode 250b impart a uniform electric field across the programmable foam 220 in a direction parallel to the direction 410. FIG. 4A illustrates an isometric view of the programmable foam 220 when the electric field is not applied electric field. A plurality of spherical voids 420 are embedded within the programmable foam 220. In an embodiment, each of the spherical voids 420 includes a plurality of molecules with an anisotropic thermal conductivity and electrical permittivity, as further described above in conjunction with FIGS. 2A and 2B. In one or more embodiments, the anisotropic molecules are configured to align in the direction 410 the electric field is applied when the electric field is applied. While FIGS. 4A and 4B describe application of an electric field, in other embodiments, the spherical voids 420 include anisotropic molecules that align in the direction 410 of a magnetic field applied to the programmable foam 220.

In the example of FIG. 4A, the anisotropic molecules are scattered 430 (e.g., randomly dispersed) within each spherical void 420. Scattering 430 of the anisotropic molecules within the spherical void 420 results in a baseline heat flux 450 parallel to the direction 410 through the programmable foam 220. In some embodiments, the programmable foam 220 is a high thermal conductivity open cell foam including the spherical voids 420. Each spherical void 420 may be filled with a gas or liquid capable of dissolving one or more anisotropic molecules or polymers having an range of diameters of 10-100 micrometers. In various embodiments, each of the plurality of anisotropic molecules is a nanorod, a nanowire, liquid crystal, quartz rods, or some combination thereof.

Conversely, FIG. 4B illustrates the programmable foam 220 when an electric field is applied parallel to the direction 410. In the example of FIG. 4B, application of the electric field causes the anisotropic molecules in the spherical voids 420 to align 440 with the electric field through the programmable foam 220. Alignment of the anisotropic molecules along one or more electric field lines of the generated electric field increases the heat flux 450 across the programmable foam 220. Generally, the magnitude of the heat flux 450 is proportional to the magnitude of the electric (or magnetic) field applied to the programmable foam 220. Hence, the magnitude of the heat flux 450 may be modulated by modulating the electric (or magnetic) field applied to the programmable foam 220. In an example embodiment, a normal thermal conductivity (e.g., no applied electric field) of the programmable foam 220 is 6.5 $Wm^{-1}K^{-1}$. In the example embodiment described above, the application of an electric field across the programmable foam 220 with a magnitude sufficient to rotate a quartz rod in suspension by 90 degrees from its C-plane results in change in a in the thermal conductivity 450 of the programmable foam of 4.8 $Wm^{-1}K^{-1}$. Alternatively, in other embodiments, applying an electric or magnetic field decreases the heat flux 450 of the programmable foam 220.

Figure 5:
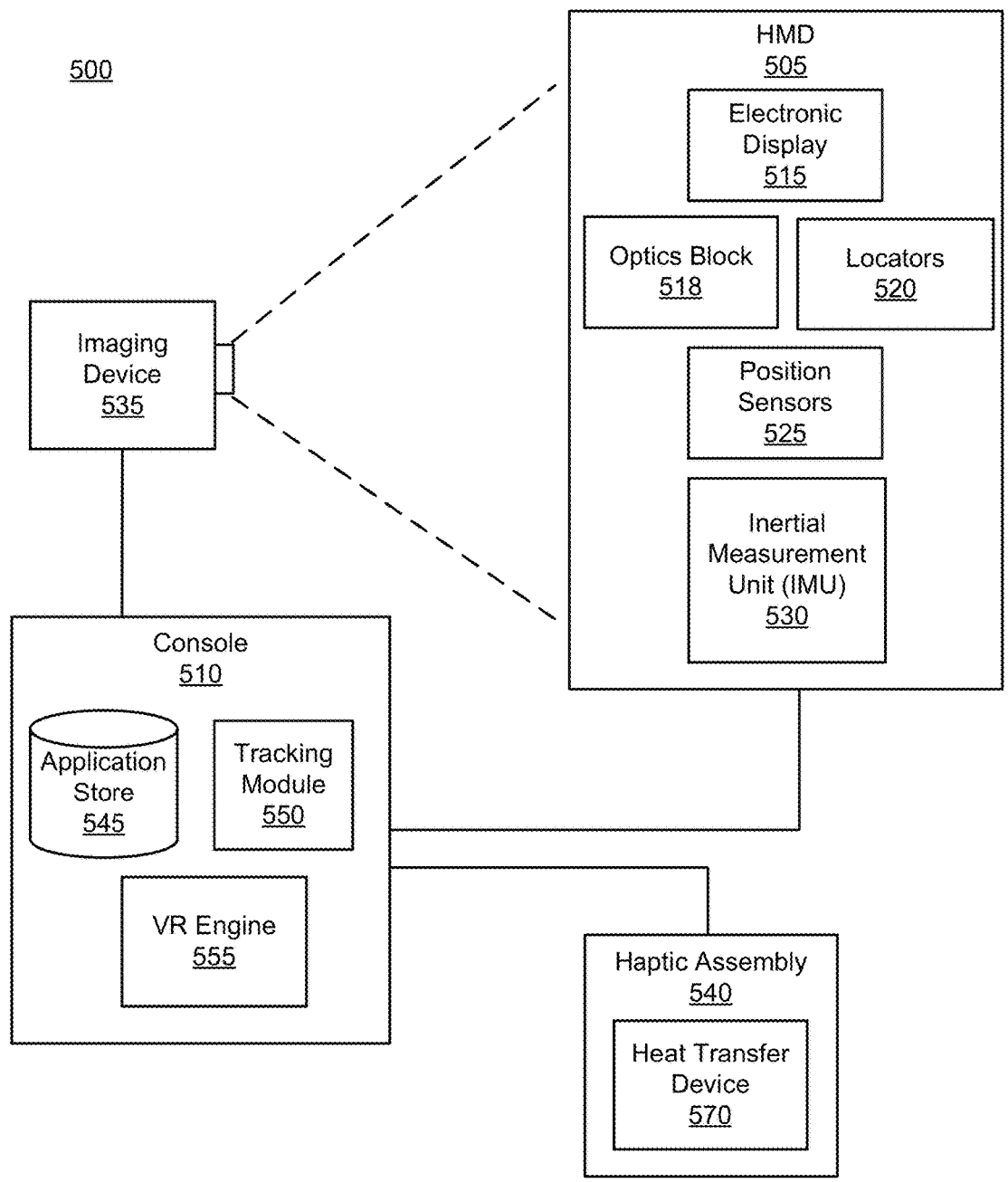
FIG. 5 is a block diagram of a system including a haptic assembly, in accordance with one or more embodiments.

FIG. 5 is a block diagram of a system environment 500 including a haptic assembly 540, in accordance with one embodiment. The system environment 500 may operate in a VR environment, an augmented reality (AR) environment, a mixed reality (MR) environment, or some combination thereof. The system 500 comprises a head-mounted display (HMD) 505, an imaging device 535, and the haptic assembly 540, which are each coupled to a console 510. While FIG. 5 shows an example system environment 500 including one HMD 505, one imaging device 535, and one haptic assembly 540, in other embodiments any number of these components may be included in the system environment 500. For example, there may be multiple HMDs 505 each having an associated haptic assembly 540 and being monitored by one or more imaging devices 535, with each HMD 505, haptic assembly 540, and imaging device 535 communicating with the console 510. In alternative configurations, different and/or additional components may be included in the system environment 500.

The HMD 505 is a head-mounted display that presents content to a user. Examples of content presented by the HMD 505 include one or more images, video, audio, or some combination thereof. In some embodiments, audio is presented via an external device (e.g., speakers and/or headphones) that receives audio information from the HMD 505, the console 510, or both, and presents audio data based on the audio information. The HMD 505 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. In some embodiments, the HMD 505 may act as an augmented reality (AR) and/or mixed reality (MR) headset. In these embodiments, the HMD 505 augments views of a physical, real-world environment with computer-generated elements (e.g., images, video, sound).

The HMD 505 includes an electronic display 515, an optics block 518, one or more locators 520, one or more position sensors 525, and an inertial measurement unit (IMU) 530. In different embodiments, the HMD 505 may include different or additional components than those described in conjunction with FIG. 5. Additionally, the functionalities further described below may be distributed among components of the HMD 505 differently than as described in conjunction with FIG. 5.

The optics block 518 magnifies received light from the electronic display 515, corrects optical errors associated with the image light, and the corrected image light is presented to a user of the HMD 505. The optics block 518 includes one or more optical elements to correct the optical errors. An optical element may be an aperture, a Fresnel lens, a convex lens, a concave lens, a filter, or any other suitable optical element that affects the image light emitted from the electronic display 515. Moreover, the optics block 518 may include combinations of different optical elements. In some embodiments, one or more of the optical elements in the optics block 518 may have one or more coatings, such as anti-reflective coatings.

The locators 520 are objects located in specific positions on the HMD 505 relative to one another and relative to a specific reference point on the HMD 505. A locator 520 may be a light emitting diode (LED), a corner cube reflector, a reflective marker, a type of light source that contrasts with an environment in which the HMD 505 operates, or some combination thereof. In embodiments where the locators 520 are active (i.e., an LED or other type of light emitting device), the locators 520 may emit light in the visible band (~380 nm to 550 nm), in the infrared (IR) band (~750 nm to 1 mm), in the ultraviolet band (10 nm to 380 nm), some other portion of the electromagnetic spectrum, or some combination thereof.

In some embodiments, the locators 520 are located beneath an outer surface of the HMD 505, which is transparent to the wavelengths of light emitted or reflected by the locators 520 or is thin enough to not substantially attenuate the wavelengths of light emitted or reflected by the locators 520. Additionally, in some embodiments, the outer surface or other portions of the HMD 505 are opaque in the visible band of wavelengths of light. Thus, the locators 520 may emit light in the IR band under an outer surface that is transparent in the IR band but opaque in the visible band.

The IMU 530 is an electronic device that generates fast calibration data based on measurement signals received from one or more of the position sensors 525. A position sensor 525 generates one or more measurement signals in response to motion of the HMD 505. Examples of position sensors 525 include: one or more accelerometers, one or more gyroscopes, one or more magnetometers, another suitable type of sensor that detects motion, a type of sensor used for error correction of the IMU 530, or some combination thereof. The position sensors 525 may be located external to the IMU 530, internal to the IMU 530, or some combination thereof.

Based on the one or more measurement signals from one or more position sensors 525, the IMU 530 generates fast calibration data indicating an estimated position of the HMD 505 relative to an initial position of the HMD 505. For example, the position sensors 525 include multiple accelerometers to measure translational motion (forward/back, up/down, left/right) and multiple gyroscopes to measure rotational motion (e.g., pitch, yaw, roll). In some embodiments, the IMU 530 rapidly samples the measurement signals and calculates the estimated position of the HMD 505 from the sampled data. For example, the IMU 530 integrates the measurement signals received from the accelerometers over time to estimate a velocity vector and integrates the velocity vector over time to determine an estimated position of a reference point on the HMD 505. Alternatively, the IMU 530 provides the sampled measurement signals to the console 510, which determines the fast calibration data. The reference point is a point that may be used to describe the position of the HMD 505. While the reference point may generally be defined as a point in space; however, in practice the reference point is defined as a point within the HMD 505 (e.g., a center of the IMU 530).

The IMU 530 receives one or more calibration parameters from the console 510. As further discussed below, the one or more calibration parameters are used to maintain tracking of the HMD 505. Based on a received calibration parameter, the IMU 530 may adjust one or more IMU parameters (e.g., sample rate). In some embodiments, certain calibration parameters cause the IMU 530 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 535 generates slow calibration data in accordance with calibration parameters received from the console 510. Slow calibration data includes one or more images showing observed positions of the locators 520 that are detectable by the imaging device 535. The imaging device 535 may include one or more cameras, one or more video cameras, any other device capable of capturing images including one or more of the locators 520, or some combination thereof. Additionally, the imaging device 535 may include one or more filters (e.g., used to increase signal to noise ratio). The imaging device 535 is designed to detect light emitted or reflected from locators 520 in a field of view of the imaging device 535. In embodiments where the locators 520 include passive elements (e.g., a retroreflector), the imaging device 535 may include a light source that illuminates some or all of the locators 520, which retro-reflect the light towards the light source in the imaging device 535. Slow calibration data is communicated from the imaging device 535 to the console 510, and the imaging device 535 receives one or more calibration parameters from the VR console 510 to adjust one or more imaging parameters (e.g., focal length, focus, frame rate, ISO, sensor temperature, shutter speed, aperture).

The haptic assembly 540 is a device that allows the console 510 to provide haptic feedback to a user. Haptic feedback provided to the user includes a sensation of temperature (e.g., hot or cold). In one embodiment, the haptic assembly 540 is a glove that renders a sensation of temperature to a user wearing the glove based on one or more instructions received from the console 510, which allows the user to interact with a virtual object. In other embodiments, the haptic assembly 540 is another device or system configured to be worn by a user over a joint (e.g., a knee, elbow, ankle, or shoulder) or other portion of the user's body as further described below in conjunction with FIGS. 7 and 8.

In FIG. 5, the haptic assembly 540 includes one or more heat transfer devices 570, such as those described above in conjunction with FIGS. 1A-2B. The haptic assembly 540 receives, from the console 510, a haptic feedback signal and provides haptic feedback to the user based on the received haptic feedback signal. For example, the haptic feedback assembly 540 provides the user with haptic feedback providing the user with a sensation of touching a warm or cold virtual object in a virtual environment according to the haptic feedback signal. For example, if a user's finger is in contact with a cold virtual object (e.g., a virtual ice) in the virtual environment, the haptic assembly 540 provides a sensation of cold to the user's finger based on a haptic feedback signal from the console 510. As another example, the haptic assembly 540 provides a sensation of heat or cold to the user based on one or more instructions received from the console 510.

The console 510 provides content to the HMD 505 for presentation to the user in accordance with information received from one or more of: the imaging device 535, the HMD 505, and the haptic assembly 540. In the example shown in FIG. 5, the console 510 includes an application store 545, a tracking module 550, and a virtual reality (VR) engine 555. Some embodiments of the console 510 have different modules than those described in conjunction with FIG. 5. Similarly, the functions further described below may be distributed among components of the console 510 in a different manner than is described here.

The application store 545 stores one or more applications for execution by the console 510. An application is a group of instructions, that when executed by a processor, generates content for presentation to the user. Content generated by an application may be in response to inputs received from the user via movement of the HMD 505 or the haptic assembly 540. Examples of applications include: gaming applications, conferencing applications, video playback application, or other suitable applications.

The tracking module 550 calibrates the system environment 500 using one or more calibration parameters and may adjust one or more calibration parameters to reduce error in determination of the position of the HMD 505. For example, the tracking module 550 adjusts the focus of the imaging device 535 to obtain a more accurate position for observed locators on the HMD 505. Moreover, calibration performed by the tracking module 550 also accounts for information received from the IMU 530. Additionally, if tracking of the HMD 505 is lost (e.g., the imaging device 535 loses line of sight of at least a threshold number of the locators 520), the tracking module 550 re-calibrates some or all of the system environment 500.

The tracking module 550 tracks movements of the HMD 505 using slow calibration information from the imaging device 535. The tracking module 550 determines positions of a reference point of the HMD 505 using observed locators from the slow calibration information and a model of the HMD 505. The tracking module 550 also determines positions of a reference point of the HMD 505 using position information from the fast calibration information. Additionally, in some embodiments, the tracking module 550 may use portions of the fast calibration information, the slow calibration information, or some combination thereof, to predict a future location of the HMD 505. The tracking module 550 provides the estimated or predicted future position of the HMD 505 to the VR engine 555.

The VR engine 555 executes applications within the system environment 500 and receives position information, acceleration information, velocity information, predicted future positions, or some combination thereof of the HMD 505 from the tracking module 550. Based on the received information, the VR engine 555 determines content to provide to the HMD 505 for presentation to the user. For example, if the received information indicates that the user has looked to the left, the VR engine 555 generates content for the HMD 505 that mirrors the user's movement in a virtual environment. Additionally, the VR engine 555 performs an action within an application executing on the VR console 510 in response to an action request received from the haptic assembly 540 and provides feedback to the user that the action was performed. The provided feedback may be visual or audible feedback via the HMD 505 or haptic feedback via the haptic assembly 540.

Figure 6:
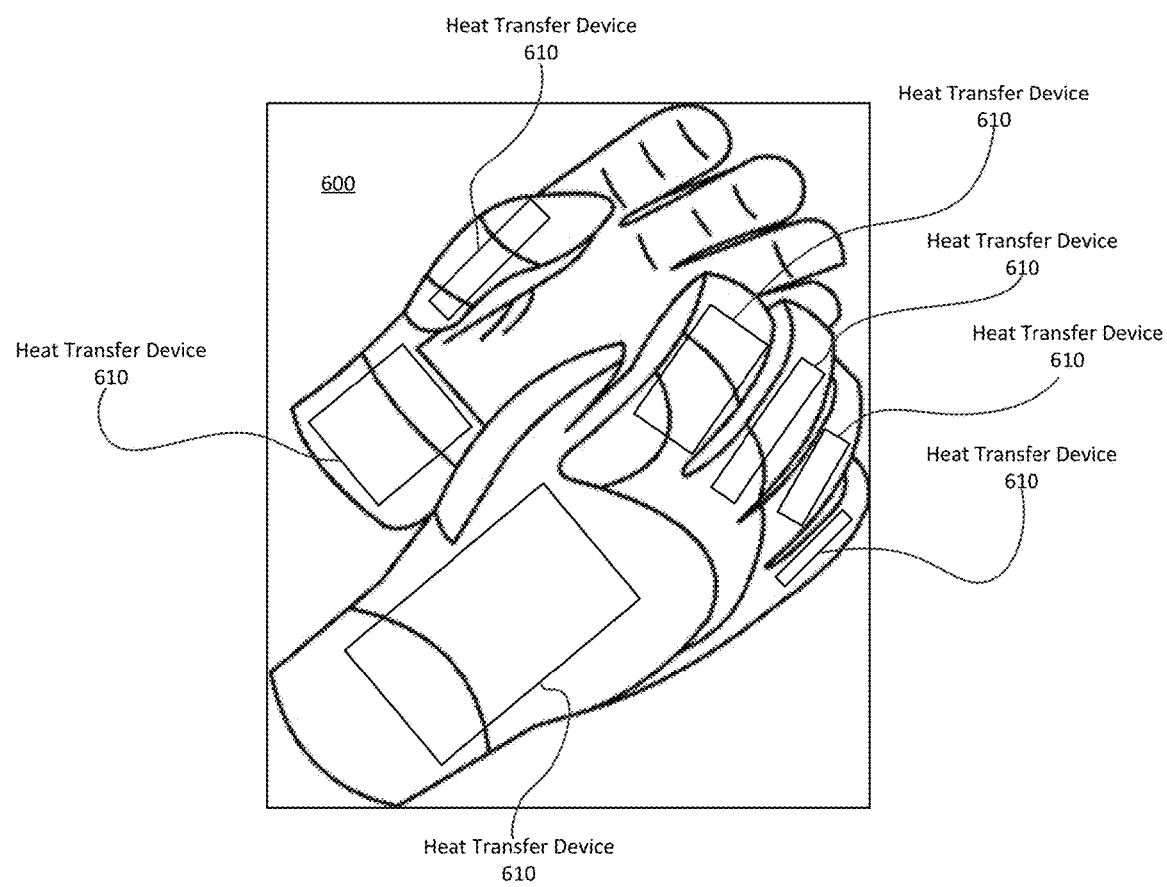
FIG. 6 illustrates a glove incorporating wearable heat transfer device, in accordance with one or more embodiments.
Figure 7:
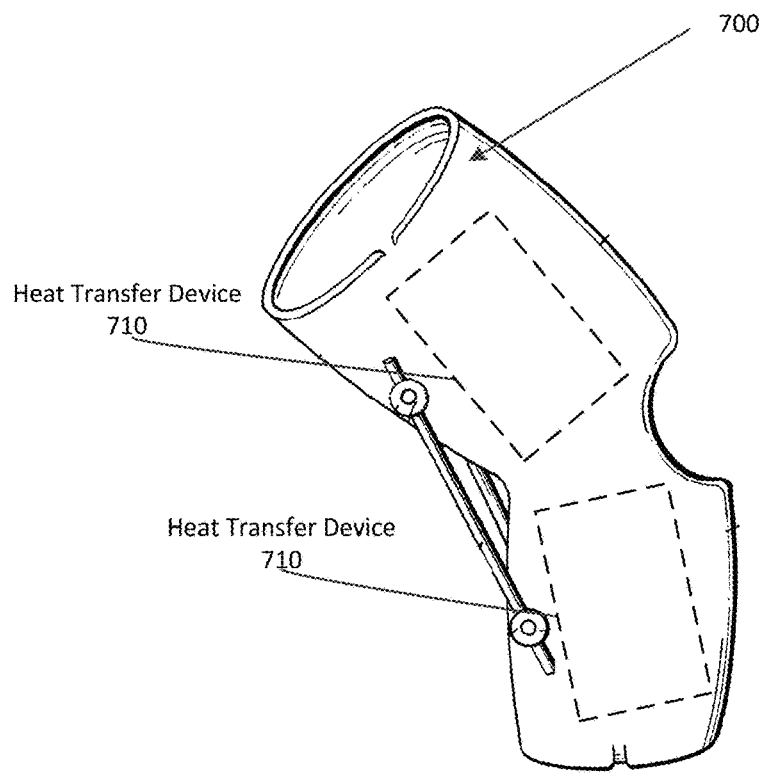
FIG. 7 illustrates a brace configured to be worn over a joint of a user and including one or more heat transfer devices, in accordance with one or more embodiments.
Figure 8:
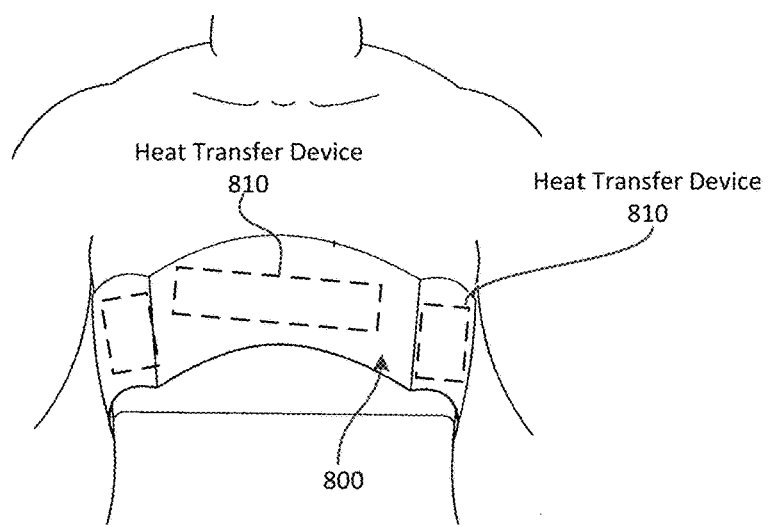
FIG. 8 illustrates a support brace configured to be worn over the waist incorporating one or more heat transfer devices, in accordance with one or more embodiments.

FIGS. 6-8 illustrate examples of wearable systems or devices including one or more heat transfer devices, such as those further described above in conjunction with FIGS. 1A-4B). A wearable device or system may also include a local controller (not shown) capable of providing voltage or current to programmable foam included in a heat transfer device, as further described above in conjunction with FIGS. 1A-4B. In various embodiments, a wearable system or device may include different or additional components than those further described below in conjunction with FIGS. 6-8.

FIG. 6 illustrates an embodiment of gloves 600 incorporating wearable heat transfer devices 610. A glove 600 depicted in FIG. 6 may be worn around a user's hand. In other embodiments, the wearable heat transfer device 610 may be incorporated into a cover (e.g., thimble or guard band) configured to be worn over a user's finger or wrist. The wearable heat transfer device 610 is a heat transfer device 100 or 200, further described above in conjunction with FIGS. 1A-4B, and is positioned within a glove so the wearable heat transfer device 610 is contacting or is proximate to sensitive areas of the user's skin. Examples of sensitive area of the user's skin include as fingers, palms, wrist joints, or other areas of the skin typically exposed to the environment.

FIG. 7 shows a brace 700 configured to be work over a knee, elbow, ankle, or shoulder joint of a user. The brace 700 includes one or more heat transfer devices 710, such as those further described above in conjunction with FIGS. 1A-4B. FIG. 8 shows a support brace 800 configured to be worn over a user's waist. In some embodiments, the support brace 800 may be configured to be worn over a user's neck or other portions of the user's torso (e.g., a user's chest, a user's back). The support brace 800 includes one or more heat transfer devices 810, such as those further described above in conjunction with FIGS. 1A-4B. The heat transfer devices 810 are positioned to contact or to be proximate to one or more contours of a portion of the user's body contacting the support brace 800.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
   a heat source configured to generate thermal energy;
   a programmable foam coupled to the heat source and comprising an open cell foam composed of a dielectric material with a plurality of voids, the programmable foam having a thickness configured to be modulated based on a received voltage; and
   a controller coupled to the programmable foam and configured to:
      receive one or more instructions from a console,
      responsive to receiving the one or more instructions, generate a voltage, and
      provide the generated voltage to the programmable foam.

2. The system of claim 1, wherein the generated voltage comprises one or more selected from a group consisting of: a transitory voltage pulse, a periodic voltage signal, a constant voltage signal, and any combination thereof.

3. The system of claim 1, wherein the heat source is further configured to dissipate thermal energy.

4. The system of claim 1, further including one or more electrodes coupled to the controller and to the programmable foam, the one or more electrodes configured to provide the generated voltage to the programmable foam.

5. The system of claim 1, further including a fan coupled to the heat source, the fan configured to provide a heat transfer path between the heat source and an environment external to the heat source.

6. The system of claim 1 wherein the open cell foam has a thermal conductivity and the plurality of voids have an alternative thermal conductivity that is lower than the thermal conductivity of the open cell foam.

7. The system of claim 6, wherein a thermal conductivity of the programmable foam is inversely proportional to the thickness of the programmable foam.

8. The system of claim 1, wherein the programmable foam includes an air bladder configured to inflate in response to receiving the generated voltage from the controller.

9. The system of claim 1, further comprising:
- an electrode contacting a surface of the programmable foam;
- an additional electrode contacting another surface of the programmable foam that is parallel to the surface;
- a piezoelectric actuator coupled to the electrode, to the additional electrode, and to the controller, the piezoelectric actuator configured to draw the electrode closer to the additional electrode based on the generated voltage.

* * * * *